(12) United States Patent
Zhang

(10) Patent No.: US 6,990,412 B2
(45) Date of Patent: Jan. 24, 2006

(54) TECHNIQUES TO MANUFACTURE OPTICAL SIGNAL TRANSMITTERS

(75) Inventor: Yingfan Zhang, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 169 days.

(21) Appl. No.: 10/274,170

(22) Filed: Oct. 17, 2002

(65) Prior Publication Data

US 2004/0078150 A1 Apr. 22, 2004

(51) Int. Cl.
*G01B 5/28* (2006.01)
(52) U.S. Cl. ....................................................... 702/40
(58) Field of Classification Search .................. 702/40, 702/108, 104, 49; 398/27, 82, 5, 79, 195, 398/38; 369/44, 47, 47.5; 11/36; 385/218; 395/10; 250/339, 374, 306, 492; 356/485, 356/226, 139; 372/38, 131, 31; 320/139, 320/164; 359/341; 235/454; 417/11; 607/29; 436/153; 600/3; 324/71, 537; 378/65; 423/249; 712/104
See application file for complete search history.

(56) References Cited

U.S. PATENT DOCUMENTS

| 5,371,755 | A  | * | 12/1994 | Murata et al. ............ 372/38.02 |
| 5,548,435 | A  | * | 8/1996  | Tahara et al. ................ 398/195 |
| 5,793,483 | A  | * | 8/1998  | Zehnpfennig et al. . 356/139.03 |
| 5,850,409 | A  | * | 12/1998 | Link ......................... 372/38.01 |
| 6,629,638 | B1 | * | 10/2003 | Sanchez ...................... 235/454 |
| 6,748,181 | B2 | * | 6/2004  | Miki et al. ................... 398/195 |
| 2002/0051284 | A1 | * | 5/2002 | Takatsu et al. ........... 359/341.1 |
| 2002/0126593 | A1 | * | 9/2002 | Okumura et al. ........... 369/47.5 |
| 2003/0141876 | A1 | * | 7/2003 | Mahgerefteh et al. ...... 324/537 |

\* cited by examiner

*Primary Examiner*—Michael Nghiem
*Assistant Examiner*—Tung Lau
(74) *Attorney, Agent, or Firm*—Glen B. Choi

(57) ABSTRACT

Techniques to speed the manufacturing process of devices such as optical signal transmitters, transponders, or transceivers by utilizing automated extinction ratio adjustment.

22 Claims, 4 Drawing Sheets

316

TECHNIQUES TO MANUFACTURE OPTICAL SIGNAL TRANSMITTERS

FIELD

The subject matter disclosed herein generally relates to techniques to manufacture fiber optic devices.

DESCRIPTION OF RELATED ART

Establishing an extinction ratio of optical signals transmitted by a light source of an optical signal transmitter is an important step in the fabrication of such optical signal transmitter. An extinction ratio may be defined as a ratio of two optical power levels, P1/P2, of a signal generated by an optical signal source, where P1 is the optical power level generated when the light source is "on," and P2 is the power level generated when the light source is "off."

FIG. 1 depicts a conventional system that may be used to determine an extinction ratio of optical signals output by an optical signal transmitter. A conventional technique to establish a desired extinction ratio may involve an assembly worker using an optical scope 120 to read an extinction ratio of optical signals from optical signal transmitter 110. The assembly worker may manually tune the impedance level of a potentiometer, which changes the bias current of the optical signal transmitter 110 until a desired extinction ratio is reached. After the desired extinction ratio is reached, the assembly worker may then replace the potentiometer with a resistor that has an impedance value equal to the impedance level of the potentiometer. It is desirable for the fabrication of optical signal transmitters to be as fast as possible.

BRIEF DESCRIPTION OF THE DRAWINGS

Note that use of the same reference numbers in different figures indicates the same or like elements.

DETAILED DESCRIPTION

Figure 1:
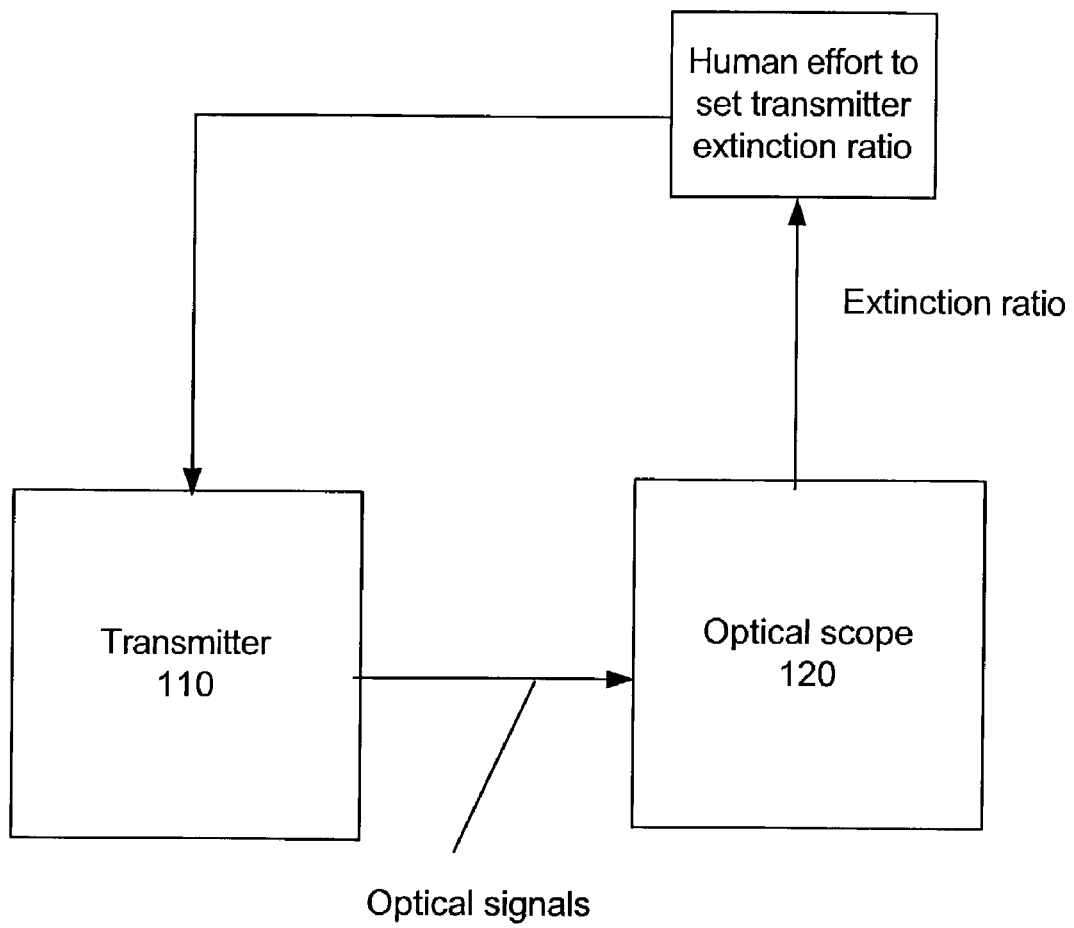
FIG. 1 depicts a conventional system that may be used to determine an extinction ratio of optical signals output by an optical signal transmitter.
Figure 2:
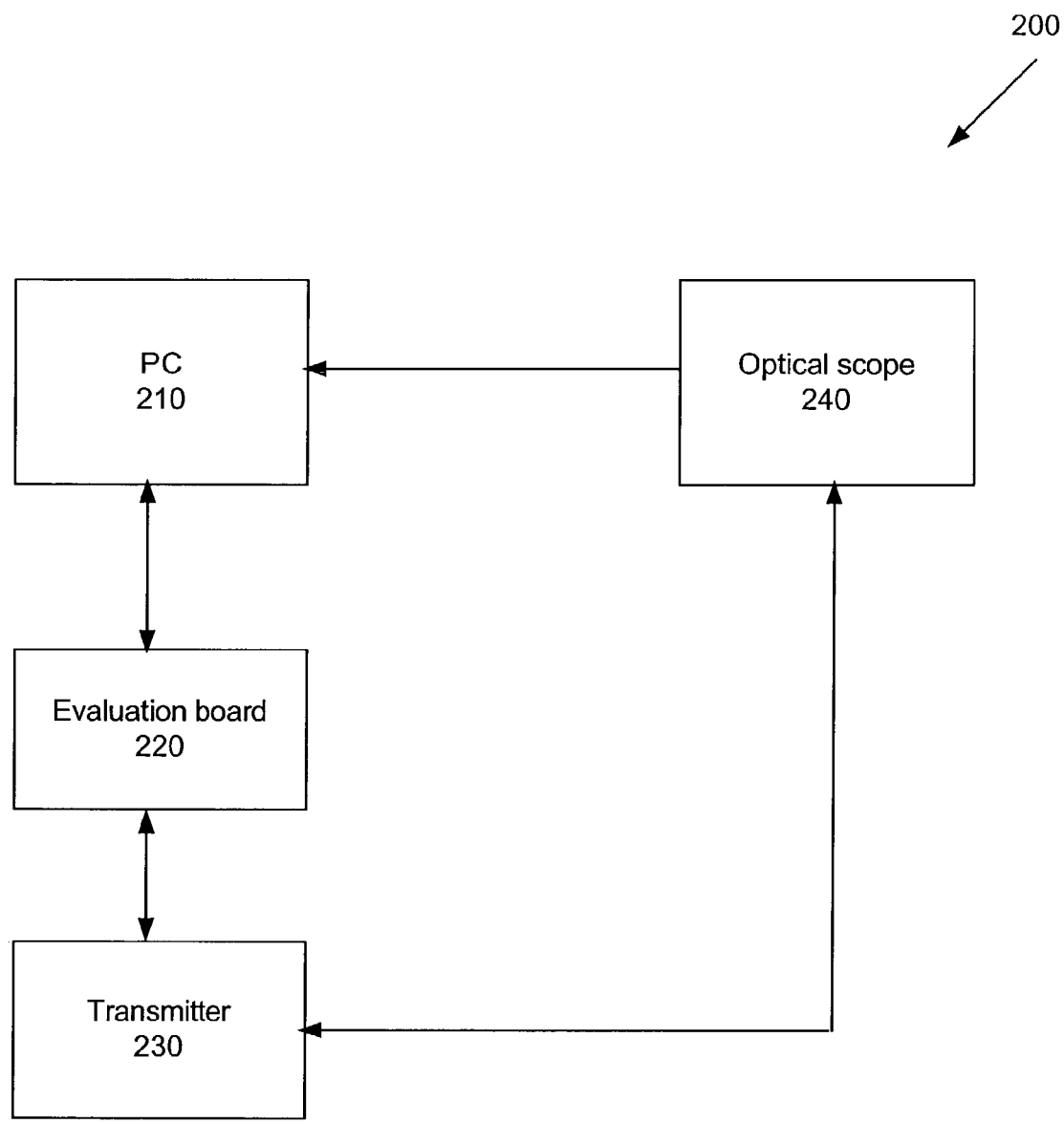
FIG. 2 depicts in block diagram form an embodiment of the present invention in a test and adjust system, in accordance with an embodiment of the present invention.

FIG. 2 depicts in block diagram form an embodiment of the present invention in test and adjust system 200. One implementation of test and adjust system 200 may include personal computer (PC) 210, evaluation board 220, transmitter 230, and optical scope 240.

One implementation of PC 210 may include a central processing unit (CPU), input/output (I/O) interface device, and memory. PC 210 may intercommunicate with the evaluation board 220 using a coaxial, parallel, serial cable, or wireless connection and may utilize the RS232, Peripheral Component Interconnect (PCI), Universal Serial Bus (USB), Ethernet (IEEE 802.3), IEEE 1394, and/or other communications protocols.

Evaluation board 220 may provide intercommunication between transmitter 230 and PC 210. For example, evaluation board 220 may include a bus to provide intercommunication between transmitter 230 and PC 210. The bus of evaluation board 220 may utilize, for example, an inter-IC ($I^2C$), Peripheral Component Interconnect (PCI), Universal Serial Bus (USB), Ethernet (IEEE 802.3), IEEE 1394, and/or other communications protocols. PC 210 may command transmitter 230 to output binary signals in optical signal format to optical scope 240. In some implementations, the PC 210 may transmit to optical scope 240 a binary signal pattern that PC 210 commands transmitter 230 to output. Optical scope 240 may measure the extinction ratio of optical signals output by transmitter 230.

In accordance with an embodiment of the present invention, PC 210 may program an extinction ratio characteristic of optical signals output by transmitter 230. For example, a suitable extinction ratio may be one that minimizes a bit error rate of optical signals transmitted by the transmitter 230, enables the optical signals to reach a desired distance, and minimizes the dispersion penalty. In one embodiment, a person may program PC 210 with a desired extinction ratio.

Figure 3:
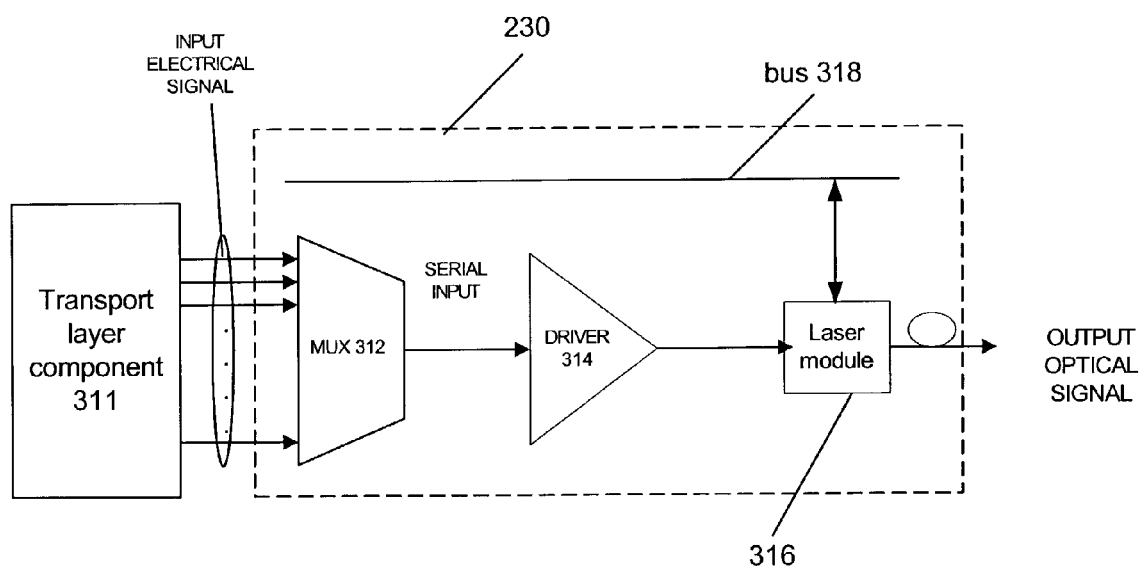
FIG. 3 depicts in block diagram format an example implementation of a transmitter, in accordance with an embodiment of the present invention.

FIG. 3 depicts in block diagram format an example implementation of transmitter 230, in accordance with an embodiment of the present invention. Transmitter 230 may include multiplexer (MUX) 312, driver 314, laser module 316, and bus 318.

A transport layer component 311 may provide electrical signals to MUX 312. Transport layer component 311 may provide electrical signals in a format in accordance with Synchronous Optical Network (SONET), Optical Transport Network (OTN), and/or Synchronous Digital Hierarchy (SDH). With respect to such electrical signals, transport layer component 311 may perform media access control (MAC) management in compliance for example with Ethernet; framing and wrapping in compliance for example with ITU-T G.709; and/or forward error correction (FEC) processing, for example in accordance with ITU-T G.975; and/or other layer 2 processing.

MUX 312 may receive electrical signals in parallel format and provide such electrical signals in a serial format. Driver 314 may receive the electrical signals from MUX 312 in serial format and amplify such signals. Laser module 316 may convert electrical signals from driver 314 into optical format. Laser module 316 may transmit optical signals, for example, to an optical network which may comply, for example, with SONET, OTN, and/or SDH.

In accordance with an embodiment of the present invention, optical signals output by laser module 316 may have an extinction ratio that is tunable by PC 210. Bus 318 may provide communication between evaluation board 220 and laser module 316. Bus 318 may utilize for example an inter-IC ($I^2C$), Peripheral Component Interconnect (PCI), Universal Serial Bus (USB), Ethernet (IEEE 802.3), IEEE 1394, and/or other communications protocols. In accordance with an embodiment of the present invention, bus 318 may provide a communications path for PC 210 to set the extinction ratio of optical signals output by laser module 316.

Figure 4:
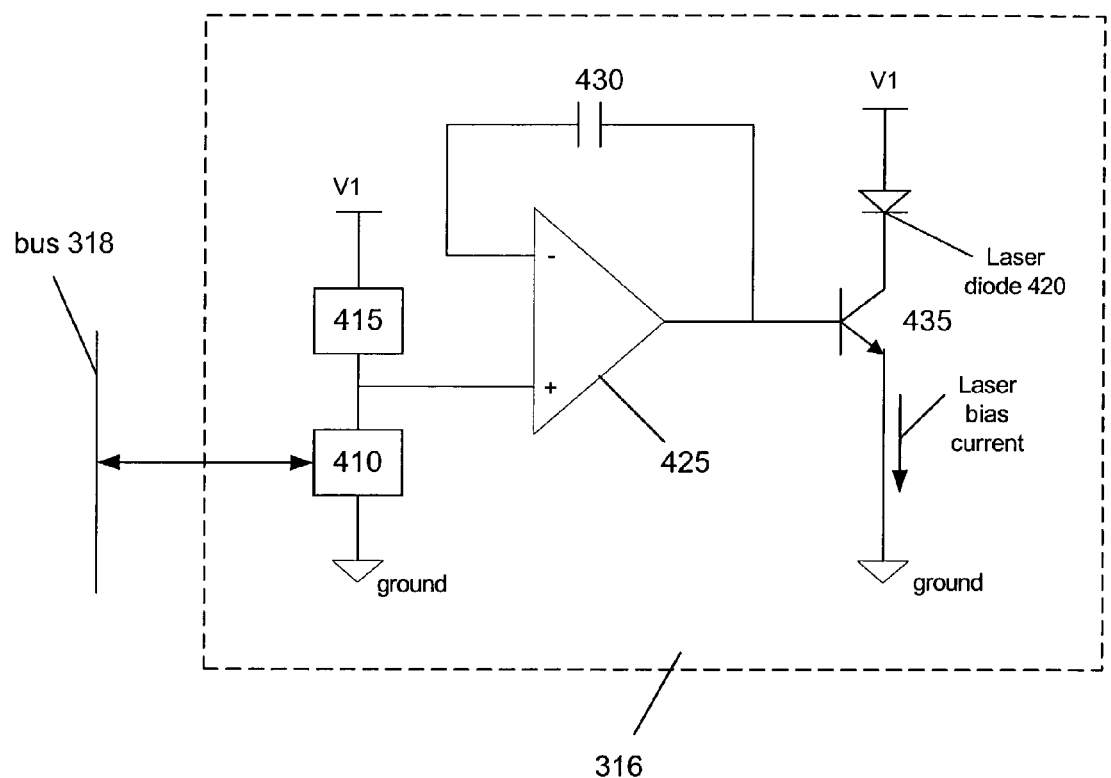
FIG. 4 depicts an example manner to generate a bias current, in accordance with an embodiment of the present invention.

In accordance with an embodiment of the present invention, FIG. 4 depicts one of many possible implementations of laser module 316. Laser module 316 may include potentiometer 410, impedance element 415, laser diode 420, operational amplifier 425, capacitive element 430, and transistor 435.

Impedance element 415 may couple a positive or high bias voltage to the positive input terminal of operational amplifier 425. Impedance element 415 may be implemented as a fixed impedance device such as a resistor or circuit arrangement providing a desired resistance value. Potentiometer 410 may couple the positive input terminal of operational amplifier 425 to ground or a negative bias voltage. A suitable implementation of potentiometer 410 is a digital potentiometer available from Xicor of San Jose, Calif. In accordance with an embodiment of the present invention, PC 210 may tune the impedance level of potentiometer 410.

Capacitive element 430 may couple the output terminal of operational amplifier 425 to a negative input terminal of operational amplifier 425.

In one implementation, transistor 435 may be implemented as a BJT transistor, although other types and combinations of transistors may be used. The base terminal of transistor 435 may be coupled to the output terminal of operational amplifier 425. Laser diode 420 may couple a positive bias voltage to the collector terminal of transistor 435. The laser diode 420 may output optical signals to a single-mode optical fiber (not depicted), which may carry the optical signals to a network. The emitter terminal of transistor 435 may be coupled to ground or a negative bias voltage.

A change of the impedance value of potentiometer 410 may change the output voltage from the operational amplifier 425. A change in the output voltage of operational amplifier 425 may change the magnitude of the laser bias current. A change in the magnitude of the laser bias current may change the extinction ratio of the optical signal generated by transmitter 230. In accordance with an embodiment of the present invention, PC 210 may adjust the impedance value of potentiometer 410 using bus 318.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   measuring an extinction ratio of an optical signal directly transmitted from an optical signal source, wherein the extinction ratio comprises a ratio of power-on level of the optical signal over power-off level of the optical signal;
   transmitting a control signal to adjust the extinction ratio of the optical signal to a preferred level; and
   selectively adjusting an impedance of a potentiometer of the optical signal source in response to the control signal, wherein a laser bias current of the optical signal source is based on the impedance level.

2. The method of claim 1, wherein the measuring the extinction ratio comprises:
   transmitting an optical signal pattern from the optical signal source; and
   measuring the extinction ratio based upon the pattern.

3. The method of claim 1, wherein the transmitting the control signal comprises:
   transferring the control signal to the optical signal source using a bus.

4. The method of claim 1, wherein the optical signal source comprises:
   a bus; and
   a laser module to receive the control signal using the bus.

5. The method of claim 4, wherein the bus is compliant at least with the inter-IC protocol.

6. The method of claim 1, further comprising:
   determining a preferred impedance level based on the preferred level of the extinction ratio; and
   determining characteristics of the control signal based on the preferred impedance level.

7. An apparatus comprising:
   a computer;
   an optical signal source to selectively output optical signals in response to a first command from the computer and to selectively adjust an impedance level in response to a second command from the computer;
   an evaluation board to transfer commands from the computer to the optical signal source; and
   an optical signal scope to measure an extinction ratio of the optical signals directly output by the optical signal source and to provide the extinction ratio to the computer, wherein the extinction ratio comprises a ratio of power-on level of the optical signals to a power-off level of the optical signals, wherein the computer selectively provides the second command to the optical signal source in response to the extinction ratio differing from a target extinction ratio, and wherein the second command includes an instruction to adjust the extinction ratio of the optical signals to the target extinction ratio.

8. The apparatus of claim 7, wherein the optical signal source comprises:
   a bus to transfer commands from the evaluation board; and
   a laser module to receive commands from the bus.

9. The apparatus of claim 8, wherein the laser module comprises:
   a potentiometer to selectively adjust an impedance level in response to the second command; and
   a light source to generate an optical signal having an extinction ratio based upon the impedance level of the potentiometer.

10. The apparatus of claim 8, wherein the bus is compliant at least with the inter-IC protocol.

11. The apparatus of claim 8, wherein the laser module comprises:
    an amplifier;
    a capacitive element to couple an output terminal of the amplifier to a negative terminal of the amplifier;
    an impedance element to couple a high supply voltage to a positive terminal of the amplifier;
    a potentiometer to selectively adjust its impedance in response to the second command and to couple a low voltage to the positive terminal of the amplifier;
    a laser diode coupled to the high supply voltage and to provide an optical signal; and
    a transistor device having a first, second and third terminals, wherein
    a first terminal is coupled to the output terminal of the amplifier,
    a second terminal is coupled to the laser diode, and
    a third terminal is coupled to the low voltage.

12. An optical transceiver comprising:
    a bus capable of at least receiving commands;
    a potentiometer to selectively adjust its impedance level in response to a command provided through the bus; and
    a light source to generate an optical signal having an extinction ratio based upon the impedance level of the potentiometer, wherein the command requests the potentiometer to set the extinction ratio to a preferred level, wherein the extinction ratio is based on measurement of the optical signal directly generated by the light source, and wherein the extinction ratio comprises a ratio of power-on level of the optical signal to a power-off level of the optical signal, wherein a laser bias current of the light source is based on the impedance level.

13. The optical transceiver of claim 12, further comprising:
- an amplifier, wherein the potentiometer is to couple a low voltage to a positive terminal of the amplifier;
- a capacitive element to couple an output terminal of the amplifier to a negative terminal of the amplifier;
- an impedance element to couple a high supply voltage to the positive terminal of the amplifier; and
- a transistor device having a first, second and third terminals, wherein
  - a first terminal is coupled to the output terminal of the amplifier,
  - the light source is coupled between, the high supply voltage and the second terminal, and
  - a third terminal is coupled to the low voltage.

14. The optical transceiver of claim 12, wherein the bus is compliant at least with the inter-IC protocol.

15. The optical transceiver of claim 12, wherein the bus is compliant at least with the PCI protocol.

16. The optical transceiver of claim 12, wherein the bus is compliant at least with the USB protocol.

17. A system comprising:
- a transport layer component to provide an input signal;
- a transmitter to receive the input signal, wherein the transmitter comprises:
  - a bus capable to receive commands,
  - a potentiometer to selectively adjust its impedance level in response to a command provided through the bus, and
  - a light source to generate an optical signal based on information transmitted in the input signal and having an extinction ratio based upon the Impedance level of the potentiometer, wherein the extinction ratio is further based on measurement of the optical signal directly generated by the light source, wherein the extinction ratio comprises a ratio of power-on level of the optical signal to a power-off level of the optical signal, wherein the command requests the potentiometer to set the extinction ratio to a preferred level, and wherein a laser bias current of the light source is based on the impedance level.

18. The system of claim 17, wherein the transport layer component provides in the input signal framing information in compliance with SONET.

19. The system of claim 17, wherein the transport layer component provides in the input signal information relating to layer two processing.

20. The system of claim 17, wherein the bus is compliant at least with the inter-IC protocol.

21. The system of claim 17, wherein the bus is compliant at least with the PCI protocol.

22. The system of claim 17, wherein the bus is compliant at least with the USB protocol.

* * * * *